Feb. 10, 1925.

Re. 15,996

A. R. THOMPSON

MACHINE FOR TREATING CANNED GOODS

Original Filed Aug. 18, 1922

Inventor
Albert R. Thompson
By Alexander Howell
Attorneys

Reissued Feb. 10, 1925. Re. 15,996

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

MACHINE FOR TREATING CANNED GOODS.

Original No. 1,467,561, dated September 11, 1923, Serial No. 582,622, filed August 18, 1922. Application for reissue filed October 13, 1924. Serial No. 743,505.

*To all whom it may concern:*

Be it known that I, ALBERT R. THOMPSON, a citizen of the United States, residing at San Jose, in the county of Santa Clara and State of California, have invented certain new and useful Improvements in Machines for Treating Canned Goods; and I do hereby declare that the following is a full, clear, and exact description thereof, reference being had to the accompanying drawings, which form part of this specification.

My invention relates to that class of machines and apparatus used in the canning art, in which the canned goods while undergoing treatment are carried through a receptacle in a definite path along a track composed of a fixed helically directed rail lying near the inner circumference of the shell, and a reel within the fixed rail and rotating about the axis thereof, said reel carrying a peripheral series of rails parallel with its axis and coacting with the fixed rail to support the cams and effect their travel in a helical path from their point of entrance into the receptacle to their point of discharge therefrom. Examples of these machines are those known as "cookers" in which the canned goods are heat-treated; and those called "coolers" in which the previously cooked canned goods are subjected to a lower temperature to cool them.

In machines of this type, the common practice has been to carry the fixed helically directed rail-member of the can-track, upon a series of longitudinal stringers supported in the receptacle and spaced from its walls. I have found, however, that a simpler construction is to bolt or rivet said rail member directly to and against the wall of the receptacle in which case said receptacle must of course be of circular cross section. But this presents a difficulty of draining the receptacle of the treating liquid, namely the water used therein, since a portion of the water will remain in the bottom between the coils of the helical rail if bolted directly against the receptacle wall, and will not drain out. Also, especially in the case of cookers, which require the inclusion within the receptacle of a steam-pipe for heating the water, the disposition of the helical rail directly against the receptacle wall, leaves no room for the steam pipe, which must, necessarily, be outside of the sphere of rotation of the reel member of the can-track.

I have heretofore, as disclosed by my Patent No. 1,402,193, dated January 3, 1922, sought to remedy these difficulties by so distorting the wall of the receptacle from its circularity as to form an underlying trough-like drain chamber opening directly in the interior of the receptacle, and having the coils of the helical rail bridge the opening. I have, however, found in practice that such construction, notwithstanding the riveting effect of the helical rail tending to keep the severed and distorted walls from spreading, is faulty, especially in receptacles such as pressure cookers or coolers, and that under high internal pressure the opening at the bottom is a dangerous constructive factor in that any yielding of the receptacle walls tending to distort the can path is fatal to the operation of the machine, as an uninterrupted precise can-stream flow through the receptacle is absolutely essential to success.

The object of my invention then, is to provide simple and effective means by which the receptacle in which the fixed rail is disposed directly against its wall, may be rigidly circumferentially continuous and still may be fully drained, and may also have a space or chamber for the inclusion of a steam pipe.

With these ends in view, my invention consists in the novel machine or apparatus for treating canned goods, which I shall now fully describe by reference to the accompanying drawings, in which—

Figure 1:
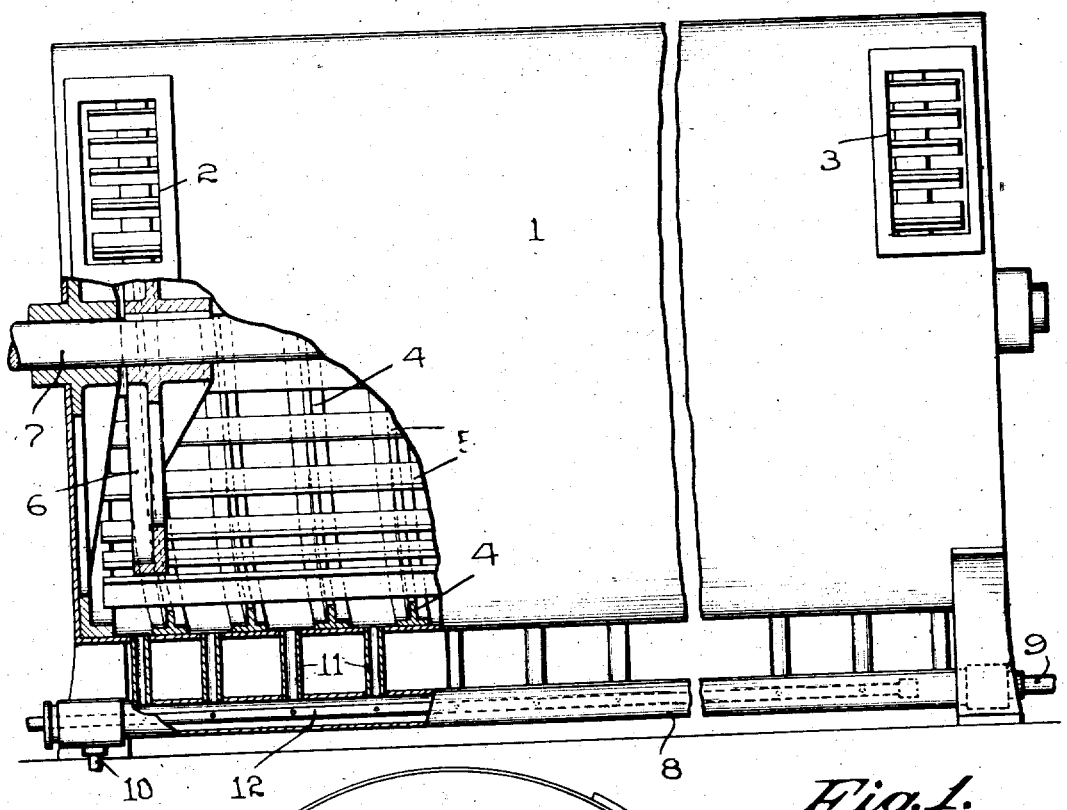
Figure 1 is a longitudinal, broken section of my improved machine or apparatus.
Figure 2:
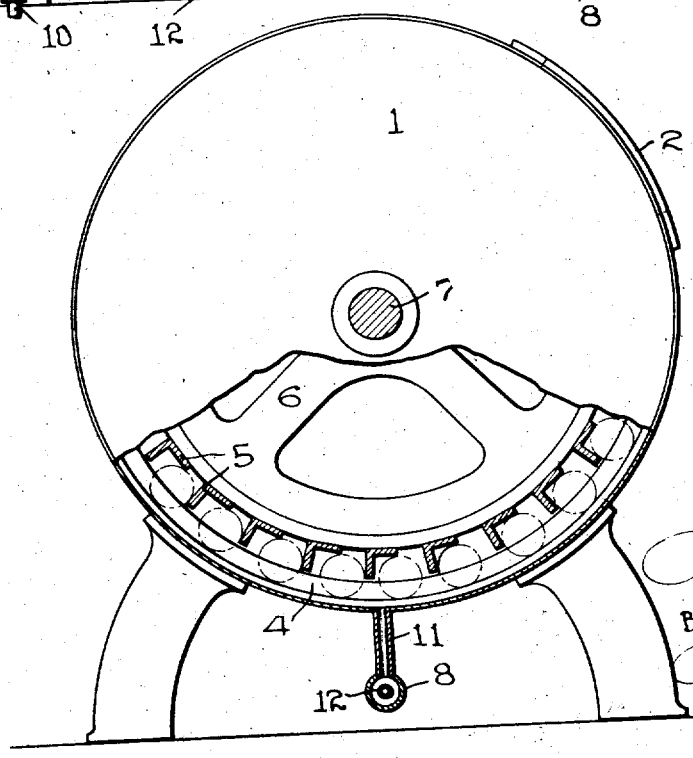
Figure 2 is an end view of the same, partly in section.

1 is the receptacle of the machine, circular in cross section and provided with an inlet indicated at 2 in Figure 1, and an exit, indicated at 3, for the canned goods which pass through it.

Within the receptacle and bolted or riveted directly to and against its wall is the fixed rail 4. This rail, which is preferably of T-section with its leg portion extending inwardly is helically directed throughout substantially the length of the receptacle, and forms one member of the can-track. The other member of said track comprises an annular series of spaced rails 5, preferably of angle section, lying and revolving within the fixed helical rail 4, in such relation thereto that the cans are carried and supported between the rail 4 and rails 5, the latter being parallel to their axis of rotation, whereby the can path is a helical one throughout the length of the receptacle, all as is now well known and common in practice. The rails 5 form the periphery of a reel having end heads 6 and a driving shaft 7.

Below the receptacle 1 is a longitudinally extending header pipe 8, into one end of which is fitted an inlet water pipe 9, and in its other end is a drain 10. Leading upwardly from the header pipe 8 are the drain pipes 11, entering the receptacle bottom, each at a point between the coils of the fixed helix rail 4.

It will now be seen that, notwithstanding the disposition of the rail 4 directly against the receptacle wall, all the treating water within the receptacle may be drained out as occasion requires.

In the case of a cooker, where a source of heat must be provided, the header pipe 8 and drain pipes 11 being outside of the fixed rail 4, serves as a means for introducing and housing a steam pipe 12.

In this improved construction, it will be seen that the circular receptacle is unbroken and may be made as capable of resisting internal pressure as the circumstances require, and still it may be fully drained and convenient provision made for introducing steam.

I claim:—

1. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a header pipe outside of and longitudinally underlying the receptacle; a plurality of drain pipes leading from the header pipe and opening into the receptacle between the coils of the helically directed rail therein, and means for introducing to the receptacle a temperature controlling medium through said header pipe and drain pipes.

2. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a header pipe outside of and longitudinally underlying the receptacle; a plurality of drain pipes leading from the header pipe and opening into the receptacle between the coils of the helically directed rail therein; and a steam pipe housed within said header pipe.

3. A machine for treating canned goods comprising a receptacle having a can inlet and a can exit; a helically directed rail in the receptacle forming one member of a can track through which the cans are advanced through the receptacle; a rotatable annular series of spaced rails within the fixed helically directed rail forming the other member of said can track; a header pipe outside of and extending longitudinally of the receptacle; a plurality of drain pipes leading from the header pipe and opening into the receptacle, and means for introducing to the receptacle a temperature controlling medium through said header pipe and drain pipes.

4. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a plurality of drain pipes opening into the receptacle between the coils of the helically directed rail therein, and means for introducing to the receptacle a temperature controlling medium through said drain pipes.

5. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a headed pipe outside of and extending longitudinally of the receptacle; a plurality of drain pipes leading from the header pipe and opening into the receptacle between the coils of the helically directed rail therein, and means for introducing a temperature controlling medium through said header pipe and drain pipes into the receptacle.

6. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a header pipe outside of the receptacle; a plurality of drain pipes leading from the header pipe and opening into the receptacle between adjacent coils of the helically directed rail therein, and means exterior to the receptacle for introducing a temperature controlling medium into the receptacle at a plurality of points between adjacent coils of the helically directed rail.

7. A machine for treating canned goods comprising a receptacle circular in cross section and having a can inlet and a can exit; a fixed helically directed rail secured to the receptacle wall and lying against the inner surface thereof, said rail forming one member of a can track through which the cans are advanced through the receptacle; a rotatable annular series of spaced rails within the fixed helically directed rail, parallel with its axis and forming the other member of said can track; a header pipe outside of the receptacle; a plurality of drain pipes leading from the header pipe and opening into the receptacle at a plurality of points between adjacent coils of the helically directed rail therein; and means exterior to the receptacle for introducing a temperature controlling medium into the receptacle at a plurality of points between adjacent coils of the helically directed rail.

8. A machine for treating canned goods comprising a receptacle having a can inlet and a can exit; and means for advancing cans through the receptacle from the inlet to the outlet; a header pipe outside of and extending longitudinally of the receptacle; a plurality of drain pipes leading from the header pipe and opening into the receptacle at different points in the length thereof, and means for introducing to the receptacle a temperature controlling medium through said header pipe and drain pipes.

9. A machine for treating canned goods comprising a receptacle having a can inlet and a can exit; a helical can track and means whereby the cans are advanced along said track through the receptacle; a header pipe outside and extending longitudinally of the receptacle; a plurality of drain pipes leading from the header pipe and opening into the receptacle between the coils of the helically directed track and means for introducing to the receptacle a temperature controlling medium through said header pipe and drain pipes.

10. A machine for treating canned goods comprising a receptacle having a can inlet and a can exit; and a helically directed can track and means for advancing cans along said track through the receptacle; a header pipe outside and extending longitudinally of the receptacle; a plurality of pipes leading from the header pipe and opening into the receptacle between the coils of the helically directed can track therein; and a steam pipe housed within said header pipe.

11. A machine for treating canned goods comprising a receptacle having a can inlet and a can exit; a helically directed can track, and means for advancing cans along said track through the receptacle; a header pipe outside of and longitudinally underlying the receptacle; a plurality of drain pipes leading from the header pipe and opening into the receptacle between the coils of the helically directed rail therein; and a steam pipe housed within said header pipe.

In testimony that I claim the foregoing as my own, I affix my signature.

ALBERT R. THOMPSON.